Feb. 28, 1939.   C. W. LE GRAND   2,148,759
VARIABLE TRANSMISSION UNIT
Filed Feb. 10, 1938
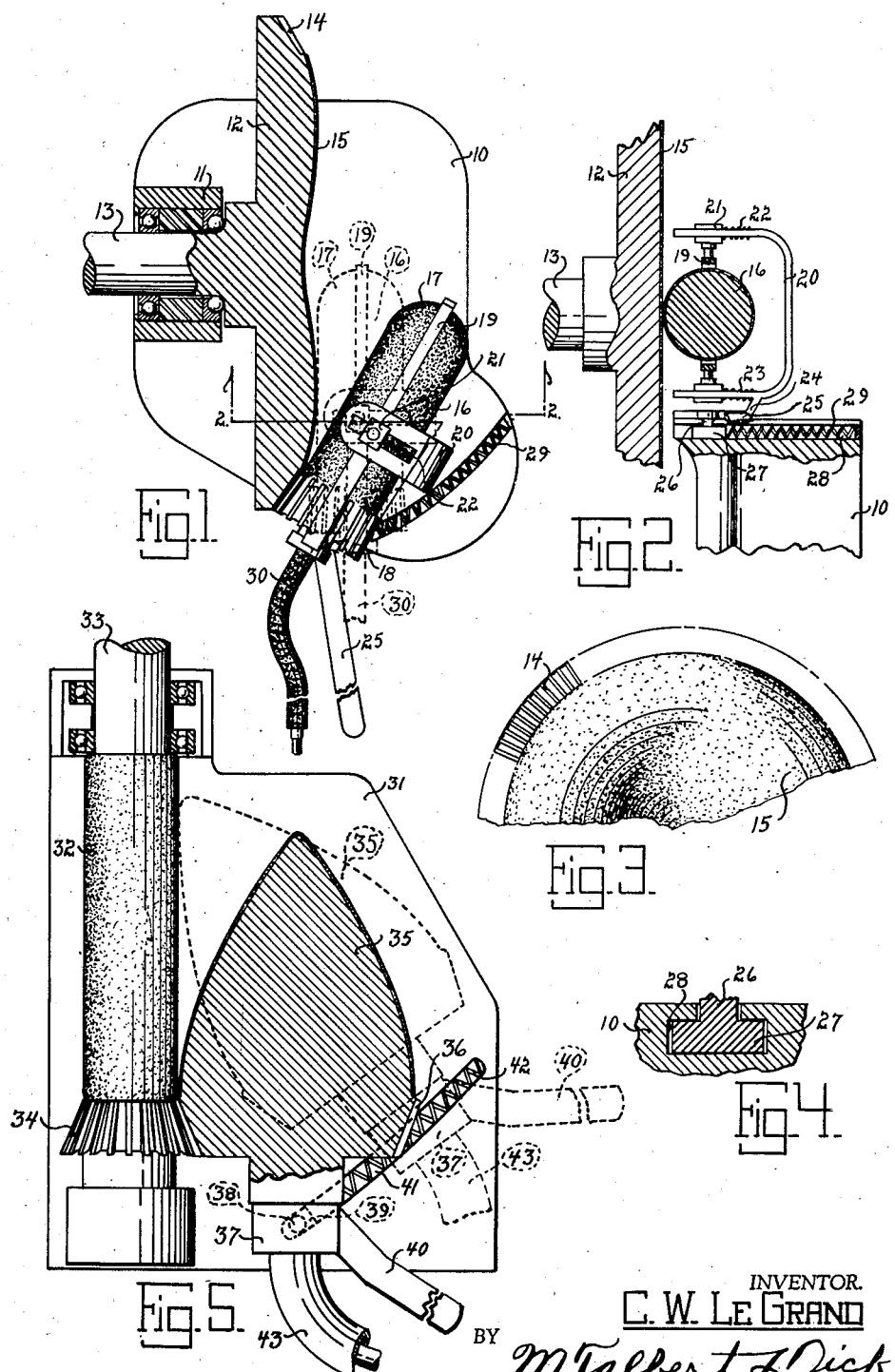
INVENTOR.
C. W. Le Grand
BY M. Talbert Dick
ATTORNEY.

Patented Feb. 28, 1939

2,148,759

UNITED STATES PATENT OFFICE 2,148,759

VARIABLE TRANSMISSION UNIT

Cecil W. Le Grand, Des Moines, Iowa

Application February 10, 1938, Serial No. 189,800

3 Claims. (Cl. 74—190)

The principal object of this invention is to provide a continuously variable transmission unit that has a positively meshed gear, low ratio gearing for obtaining maximum power and a continuously variable friction transmission drive system after the low ratio gears are out of mesh.

A still further object of this invention is to provide a transmission unit that not only gives a continuously variable gear ratio between the driving and the driven shafts, but which will decrease the gear ratio to substantial infinity for providing an over-drive adjacent the lowest ratio between the gears, or in its high speed position.

A still further object of this invention is to provide a continuously variable transmission unit that is versatile and flexible in use and which presents any desired gear ratio between the drive shaft and the driven shaft.

A still further object of this invention is to provide a transmission unit that is extremely economical in manufacture, durable and efficient in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawing, in which:

Fig. 1 is a top partial sectional view of my complete variable transmission ready for use.

Fig. 2 is an end sectional view of my transmission unit taken approximately on the line 2—2 of Fig. 1 and more fully illustrating its construction.

Fig. 3 is a front elevational view of a portion of the larger gear and friction wheel of my device.

Fig. 4 is an enlarged cross-sectional view of a portion of the base of my device showing the method of guiding the driving gear through its respective arc of rotation.

Fig. 5 is a top partial sectional view of a modified form of structure of my transmission unit.

Transmissions now in use, generally consist of a plurality of various size gears capable of being in mesh to produce varying speed ratios between the driven and the driving shafts. These transmissions do not give a continuously variable ratio of change between the gears, but step up or down by bounds. Thus, only a specific number of gear ratios are possible, and for as high as four ratios, the mechanism to accomplish this intermeshing of varying gears is complicated and costly. Friction gears have been used consisting merely of a small wheel running on the base of a larger wheel. These friction gears have been used on very light machinery and were faulty, due to the fact that enough power could not be obtained to overcome the starting inertia of the mechanism. Also it was necessary to slide the smaller gear across the face of the larger one, making a very inefficient method of reducing or increasing a gear ratio.

I have overcome such disadvantages as will be appreciated and as are hereinafter more fully set forth.

Referring to the drawing, I have used the numeral 10 to designate a base, upon which my transmission rests. The numeral 11 indicates an upwardly extending bearing housing, having therein, the usual type of ballbearings. The numeral 12 designates the gear plate or disk of my device having integrally formed thereon, the shaft 13 which is rotatably mounted in the bearing 11. The numeral 14 indicates gear teeth about the marginal edge of the gear disk 12. These teeth are beveled as shown in Fig. 1 of the drawing. The face portion of the gear plate or disk 12 is curved in diametrical cross-section and is so plotted as to give a uniform variation of contact and rotation relative to the two friction gears when immeshed. I have used the numeral 15 to designate a friction substance or facing applied to the central portion of the disk 12 as shown in the drawing. The gear 12 will hereinafter be refered to as the driven gear and the shaft 13 would, in normal practice, be secured to the mechanism to be driven, such as the rear wheels of an automobile, a lathe head, washing machine rotor or the like. I have used the numeral 16 to designate the driving gear of my device of general cylindrical shape, having its outer surface covered with a frictional material such as leather, rubber or the like and having the rounded nose or over-drive portion 17 integrally formed thereon.

The numeral 18 indicates gear teeth about the lower end of the driving gear or spindle 16, which are capable of being meshed with the gear teeth 14 when the driving gear 16 is in one of its extreme positions. I have used the numeral 19 to designate a U-shaped yoke in which the complete driving gear assembly is rotatably mounted. The numeral 20 designates a U-shaped bracket having slots in its upper and lower legs for slidably engaging the bearing elements 21 in which the U-shaped yoke 19 is rotatably mounted. The numerals 22 and 23 designate coil springs imposed between the rearward edges of the slot cut in the U-shaped bracket 20 for yieldingly holding the yoke 19 so that the gear 16 is in yielding engagement with the face of the gear 12. I have used the numeral 24 to designate a secondary bracket integrally formed on the lower leg of the bracket 20, having a manually operated handle member 25 rigidly secured thereto. The numeral 26 designates a lug integrally formed on the bracket 24 and extending downwardly and having formed on its lower end, an engaged head portion 27 as shown in Fig. 4 of the drawing. The portion of the base 10 under and adjacent the gear 16 is raised and has cut in its top surface, a T-shaped slot 28 which is formed on a logarithmic curve to conform to the arc of rotation necessary to keep the gear 16 in constant contact with the face of the gear 12. The numeral 29 indicates a coil spring within the T-shaped slot 28 and yieldingly imposed between the end portion of the slot 28 and the face of the lug 27 for forcing the complete driving gear assembly to its extreme left hand position and for yieldingly holding it in contact with the gear 12. The numeral 30 indicates a flexible shaft having one end operatively secured to the gear 16 and its other end designed to be operatively connected to a prime mover such as a motor or the like. Referring to Fig. 5 of the drawing, which is a modified form of structure embodying the same principle, but with the shafts in more approximate parallel lines, I have used the numeral 31 to designate its base portion having rotatably mounted thereon the driven friction gear 32 which is cylindrical in shape and has integrally formed on one of its ends, a shaft 33 designed to be connected to the driven mechanism. The face surface of the gear 32 is covered with a friction material of the common variety. I have used the numeral 34 to designate beveled gear teeth cut about one end of the gear 32. The numeral 35 designates the driving gear of my device which is substantially cone shaped and has its upper face portion covered with a friction material. The numeral 36 designates gear teeth cut about the lower peripheral edge of the gear 35 and capable of meshing with the teeth 34 of the gear 32 when the gear 35 is in one of its extreme positions. The numeral 37 indicates a bearing element in which the gear 35 is rotatably mounted and which has integrally formed thereon, the lug 38 and engaged head 39 as shown by dotted lines in Fig. 5. This bearing element 37 also has rigidly secured thereto, a manually operated handle member 40. It will here be noted the the lug 38 and the engaged head 39 is substantially similar to the lug 26 and engaged head 27 as shown in Fig. 4. I have used the numeral 41 to designate a T-shaped slot cut in the base 31 and in which the head 39 is slidably mounted. The numeral 42 indicates a compression spring within the slot 41 and imposed between the end of the slot and one side of the engaged head 39 for yieldingly holding the gear 35 in its extreme left position at times. The numeral 43 designates a flexible drive shaft which is connected to the prime mover or source of power such as a motor or the like.

The practical operation of my device is as follows: The flexible shaft 30 is operatively connected to a suitable source of rotary power and the shaft 13 secured to the driven mechanism. When starting, the position of the spindle or driving gear 16 will be as shown in Fig. 1, with the gears 14 and 18 immeshed. As soon as the load of starting has been accomplished and it is desired to increase the speed of rotation of the shaft 13, the handle member 25 is actuated, causing the frictional surfaces 15 and 16 of the driving and driven gears to contact each other. This causes a change of ratio, between the driving and driven shafts varying directly as the concentric movement of the spindle 16 relative to the face of the gear 12. For example, in a medium gear ratio, the spindle 16 would be in the approximate position shown by dotted lines in Fig. 1. As the spindle gear 16 is further actuated or when the driven shaft 13 is rotating leisurely without power full, the rounded end portion 17 of the spindle 16 will be rotating freely at the diametrical center of the gear 12. This is, in reality, an "over-drive". It will here be noted that the handle member 25 may be actuated by any suitable means, manual or mechanical, and the means to accomplish this may be a tortion drive, a centrifugal governor or any type of any mechanical power impulse regulating means.

The springs 22 and 23 together with the spring 29 will always keep the frictional surfaces of the gear 12 and the gear 16 in contact with each other to prevent slippage of the mechanism. With the parallel drive mechanism or transmission shown in Fig. 5, the same type of action results and the only deviation between the types is the use of substantially parallel drive shafts. In this particular instance, the substantially parabolic surface of the driving spindle or cone 35 is immeshed at the lowest speed and frictionally immeshed during its actuation to a virtually infinite gear ratio or over-drive. The practical advantage of my transmission is obvious. Where the load is the greatest at the lowest gear ratio to overcome the inertia of the driven mechanism, the driving gears are firmly immeshed and as the speed is increased and the gear ratio between the driving and driven gears decrease, the change is uniform, smooth and progressive, giving an accurate control of speed up to and including the over-drive relationship of the gears. This provides any desired ratio between the drive shaft and the mechanism for extreme efficiency of operation of the driven mechanism and to provide complete latitude of control throughout the entire gearing range.

Some changes may be made in the construction and arrangement of my variable transmission unit without departing from the real spirit and purpose of my invention, and it is my intention to cover by my claims any modified forms of structure or use of mechanical equivalents which may be reasonably included within their scope.

I claim:

1. In a device of the class described, a base portion, a disk gear rotatably mounted on said base portion, a plurality of gear teeth radially disposed about the marginal edges of the gear disk; said disk having its face surface curved in radial section and having a friction material thereon, a spindle gear operatively mounted on said base portion, a means for yieldingly holding said spindle gear in yielding frictional engagement with said first mentioned gear, gear teeth about and adjacent one end portion of said spindle gear capable of meshing with said first mentioned gear teeth at times, a frictional surface covering the balance of said spindle gear, a means for actuating said second mentioned gear relative to said first mentioned gear and in radial relationship thereto, and a means for driving said spindle gear.

2. In a transmission, a base portion, an elongated frictional gear member rotatably mounted on said base portion having a toothed gear portion radially disposed about one of its ends and a frictional gear surface disposed about its other end, a bearing element operatively secured to said base, a substantially conical gear member rotatably mounted in said bearing member and having a toothed gear portion radially disposed about its base portion and capable of engaging the gear teeth of said first mentioned member at times and a friction surface capable of engaging the frictional surface of said first mentioned gear at times, a means for actuating said second mentioned substantially conical member relative to said first mentioned elongated member, and a means for holding said first mentioned member and said second mentioned member in yielding engagement with each other.

3. In a transmission, a base element, a rotatably mounted member on said base element having a toothed gear portion and a frictional gear portion, a slidable bearing member on said base element, a yoke rotatably mounted on said slidable bearing member, an elongated member rotatably mounted in said yoke having a toothed gear portion capable of engaging the toothed gear portion of said first mentioned member at times and a frictional gear portion capable of engaging the frictional gear portion of said first mentioned gear member at times, a means for actuating said first and said second mentioned members relative to each other, and a means for holding said first and said second mentioned gears in yielding engagement with each other.

CECIL W. LE GRAND.